(12) United States Patent
Gaffard

(10) Patent No.: US 6,188,652 B1
(45) Date of Patent: *Feb. 13, 2001

(54) METHOD AND DEVICE FOR AUTOMATICALLY CORRECTING POSITIONING ERRORS OF OPTICAL ELEMENTS OF AN OPTICAL SYSTEM

(75) Inventor: Jean-Paul Gaffard, Fontainebleau (FR)

(73) Assignee: Compagnie Industrielle des Lasers Cilas, Marcoussis (FR)

( * ) Notice: Under 35 U.S.C. 154(b), the term of this patent shall be extended for 0 days.

This patent is subject to a terminal disclaimer.

(21) Appl. No.: 09/203,657

(22) Filed: Dec. 2, 1998

(30) Foreign Application Priority Data

Dec. 17, 1997 (FR) .................................................. 97 15998

(51) Int. Cl.$^7$ ........................................................ G11B 7/00
(52) U.S. Cl. ........................................... 369/44.11; 369/54
(58) Field of Search ..................... 369/43, 44.11, 369/44.32, 44.34, 53, 54; 356/150, 399, 400, 139.04, 139.05, 151, 153

(56) References Cited

U.S. PATENT DOCUMENTS 4,627,725  12/1986  Nishio et al. .
5,282,016  1/1994  Shen et al. .
5,536,916  7/1996  Kohari et al. .

FOREIGN PATENT DOCUMENTS 60-150016  8/1985  (JP) .
60-159714  8/1985  (JP) .

OTHER PUBLICATIONS

Patent Abstracts of Japan, vol. 009, No. 323 (P–414), 1 page
Patent Abstracts of Japan, vol. 010, No. 003 (P–418), 1 page.
French Search Report dated Aug. 28, 1998.

*Primary Examiner*—Paul W. Huber
(74) *Attorney, Agent, or Firm*—Marshall, O'Toole, Gerstein, Murray & Borun

(57) ABSTRACT

The present invention relates to a method and to a device for automatically correcting, in a single application, positioning errors of optical elements of an optical system, with respect to the optical axis of said system. According to the invention, said device (1) has means (A1, A2, Am) for taking measurements representative of image shifts with respect to said optical axis, a calculation unit (UC) for determining on the basis of said measurements, values representative of positioning errors of optical elements, and means (C1, C2, Cn) for automatically modifying the positioning of said optical elements on the basis of these values.

12 Claims, 1 Drawing Sheet

METHOD AND DEVICE FOR AUTOMATICALLY CORRECTING POSITIONING ERRORS OF OPTICAL ELEMENTS OF AN OPTICAL SYSTEM

The present invention relates to a method and to a device for automatically correcting positioning errors of optical elements of an optical system.

In the scope of the present invention, an optical system consists of a plurality of optical elements, for example lenses, mirrors, diaphragms and optical detectors, which are centered with respect to the optical axis of said system and are intended to be subjected to a light beam.

Although not exclusively, the present invention can be applied particularly well to a system of the laser type.

In order for such an optical system, in particular a laser system, to be capable of operating normally and effectively, it is necessary for said optical elements to be positioned properly with respect to the optical axis of said system.

It is consequently necessary to correct any positioning error existing at the start of the operations or appearing during said operations.

In known fashion, in order to make such a correction a plurality of sequential processes are performed, each of which consists in measuring the position of an image and in intervening on one of the optical elements to recenter this image. The same process is carried out for a plurality of images, one image after another, each time by choosing a suitable optical element.

It is generally found that intervention on any one optical element of the system leads to effects on a plurality of images lying downstream of this optical element. This is due, in particular, to the fact that a light beam is defined with respect to two plans, namely a focal plane and a pupil plane. These two plans are imaged by the various optical elements all along the system. Intervention on one optical element thus simultaneously displaces these two images plans.

It is consequently necessary, in order to achieve full and satisfactory adjustment of the optical system, to repeat the same sequences of checking and correcting position a plurality of times. This known correction method is therefore iterative, and the time which it takes increases rapidly as a function of the desired precision.

The object of the present invention is to overcome these drawbacks. It relates to a method for automatically correcting, in a single operation, positioning errors of optical elements of an optical system, with respect to the optical axis of said system, said method being one which does not need iterative interventions and the desired precision being obtained after the first application.

To this end, according to the invention, said method is noteworthy in that:
m pairs of measurements are taken in measurement planes distributed over said system, m being an integer greater than or equal to 2, each of said m measurement pairs being representative of an image shift with respect to said optical axis in the corresponding measurement plane;
a matrix relationship:

$$|M|=|A|.|C|$$

is defined, in which
. $|M|$ is a column vector comprising said m pairs of measurements;
. $|C|$ is a column vector comprising 2n values which are respectively representative of the positioning errors of n optical elements, n being an integer less than or equal to m; and . $|A|$ is a transformation matrix;
the transformation matrix $|A|$ is determined, which matrix may be assumed to be constant;
the 2n values of the column vector $|C|$ are calculated on the basis of the matrix expression:

$$|C|=|A|^{-1}.|M|,$$

$|A|^{-1}$ being the inverse or "pseudo-inverse" matrix of $|A|$; and
the positioning of said n optical elements is modified respectively in accordance with the 2n values previously calculated, so as to correct the positioning errors.

Thus, by virtue of the invention, after the first application of said method, said n optical elements (n not necessarily being the total number of optical elements in the optical system, as will be seen below) are positioned so that the correction is made. No iterative intervention is consequently necessary.

Further, since it is possible to use a working light beam of the optical system during the measurements, it is possible to make the correction at the same time as the work done by the optical system is being carried out (measurements, calculations, corrections, etc.). In this case, the correction does not cause any time to be lost.

Of course, in the scope of the present invention, said images may also be formed with the aid of an auxiliary light beam which is specifically intended for implementing the method according to the invention.

Moreover, in the preferred embodiment, the transformation matrix $|A|$ is determined through calculation, by simulating the path of a light beam in said optical system with the aid of geometrical optics. As a variant, this matrix may also be determined experimentally on the system itself.

Further, the matrix $|A|^{-1}$ is preferably calculated on the basis of the transformation matrix $|A|$, with the aid of an inversion method employing decomposition into singular values. This method also has the advantage of determining the minimum number of optical elements needed for making the corrections. This number is generally less than the total number of optical elements in the system, which makes it possible to reduce and minimize the number of corrections to be made.

According to the invention, a measurement plane may be:
a pupil plane of an optical element; or
a focal plane of an optical element; or
an abitrary plan lying in the system.

Moreover, a relationship between the measurement errors and the correction errors is advantageously determined on the basis of the expression:

$$|\epsilon^2|=|A|^{-1}.|\sigma^2|.(|A|^{-1})^5$$

in which:
$|\epsilon^2|$ is a matrix made up of the variance of the positioning errors of at least one optical element;
$|\sigma^2|$ is a matrix made up of the variance of the corresponding measurement errors; and
$(|A|^{-1})^5$ is the transpose of the matrix $|A|^{-1}$.

This relationship makes it possible for the characteristics and the properties of the measurement means and of the correction (or positioning) means to be optimally matched.

The present invention also relates to a device of the aforementioned type for automatically correcting positioning errors.

According to the invention, said device is noteworthy in that it has:

first means for taking 2m measurements in measurement planes of said system, m being an integer greater than or equal to 2, each of said 2m measurements being representative of an image shift with respect to said optical axis in the corresponding measurement plane, and namely in a first direction of said measurement plane for one half of said measurements and in a second direction for the other half;

a calculation unit for determining, on the basis of said 2m measurements, 2n values which are respectively representative of positioning errors, both in said first and in said second directions, of n optical elements, n being an integer less than or equal to m, said calculation unit using for this purpose the matrix expression $|M|=|A|.|C|$ with $|M|$ and $|C|$ being column vectors respectively comprising the 2m measurements and the 2n values and $|A|$ being a transformation matrix; and second means for automatically modifying the positioning of said n optical elements, respectively in accordance with the 2n values calculated by the calculation unit, so as to correct the positioning errors.

Further, advantageously:

at least some of said first means comprise image detectors and associated automatic image-processing means; and/or at least some of said second means comprise electromechanical positioning components.

The figures of the appended drawing will clearly show how the invention may be embodied. In these figures, identical references denote similar elements.

Figure 1:
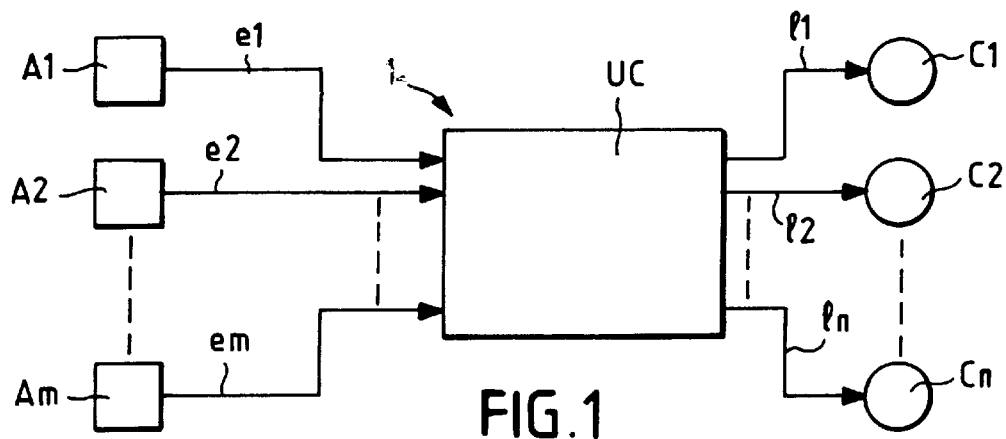
FIG. 1 is a block diagram of a device according to the invention.

The device 1 according to the invention, schematically represented in FIG. 1, is intended to automatically correct positioning errors of optical elements, for example lenses, mirrors, diaphragms or optical detectors, which are indicated below, of an optical system CH1 or CH2, with respect to the optical axis of the system CH1 or CH2, said systems CH1 and CH2 being represented, in two different embodiments, respectively in FIGS. 2 and 4.

For this purpose, said device 1 has, according to the invention:

means A1 to Am, of known type, which comprise for example image detectors and associated automatic image-processing means (not shown) which are intended to take image shift measurements, for example by a center of gravity calculation;

a calculation unit UC which is connected, via links e1 to em, respectively to said means A1 and Am and, on the basis of the measurements taken by these means, determines commands for correcting the positioning;

means C1 to Cn which are connected, respectively via links l1 to ln, to the calculation unit UC and modify the positioning of associated optical elements which are indicated below, as a function of the commands for correcting positioning which are received from said calculation unit UC. The number m is greater than or equal to the number n.

Figure 3:
FIG. 3 shows a particular embodiment of measurement means.
Figure 3:
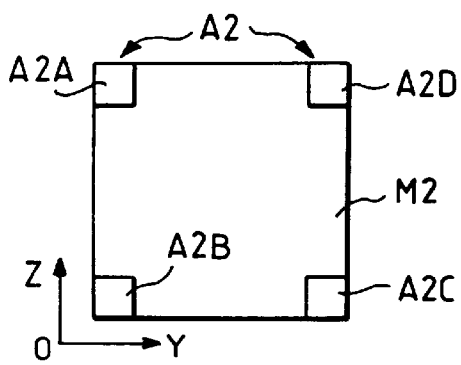

According to the invention, each of said means A1 to Am takes two measurements of the image shift with respect to the optical axis X—X or L—L of the system CH1 or CH2, in a measurement plane orthogonal to said optical axis X—X or L—L, namely:

a first measurement in one direction OY of said measurement plane; and a second measurement in a direction OZ of said measurement plane which is orthogonal to said direction OY, as represented in FIG. 3.

Said measurement plane is, according to the invention, the focal plane or the pupil plane of an optical element, or an arbitrary plan such as the plan of an optical element M2, as represented in FIG. 3.

Further, to make its calculation, the calculation unit UC uses a matrix relationship:

$$|M|=|A|.|C|$$

in which:

$|M|$ is a column vector comprising said 2m measurements taken by the means A1 to Am;

$|C|$ is a column vector comprising 2n values which are respectively representative of the positioning errors, both in the direction OY and in the direction OZ, of n optical elements with which the n means C1 to Cm are respectively associated; and $|A|$ is a transformation matrix.

According to the invention, this transformation matrix $|A|$ is determined, that is to say its components are determined, through calculation by simulating the path of a light beam in said optical system CH1 or CH2 with the aid of geometrical optics.

As a variant, the components of the matrix $|A|$ may also be determined empirically:

by performing determined displacements of the optical elements;

by measuring the two image shifts induced by these displacements; and by determining a relationship between the displacements and the measurements.

On the basis of this matrix $|A|$, the calculation unit UC determines the inverse matrix $|A|^{-1}$. It then calculates the 2n values of the column vector $|C|$ on the basis of the matrix expression:

$$|C|=|A|^{-1}.|M|.$$

These 2n values representative of positioning errors of n optical elements are transmitted to the means C1 to Cn which automatically modify the positioning of these elements so as to correct said positioning errors. The means C1 to Cn are of known type and, for example, comprise electromagnetic positioning components which act on the associated optical elements.

Thus, by virtue of the invention, the device 1 makes it possible to automatically and precisely correct, in a single application, all the positioning errors of the optical system CH1 or CH2.

Consequently, no iterative intervention is necessary, and this allows the correction time to be reduced considerably. Other advantages of the invention are indicated below.

In a preferred embodiment, the matrix $|A|^{-1}$ is calculated, with the aid of an inversion method known as "decomposition into singular values", on the basis of the transformation matrix $|A|$. With the aid of this method, the eigenmodes of the transformation matrix are analyzed and its degeneracies are eliminated, which makes it possible to substantially reduce the number of measurements to be taken and the number of corrections to be made, in particular in the case of a system with multiple light beam transits.

Consequently, the number n of optical elements whose position is corrected, and thus also the number of means C1 to Cn to be used for this purpose, is less than the total number of optical elements in the system CH1 or CH2, and this makes it possible to reduce the cost of the device 1.

Moreover, according to the invention, a relationship between the measurement errors and the correction errors is determined on the basis of the expression:

$$|\epsilon^2|=|A|^{-1}.|\sigma^2|.(|A|^{-1})^t \quad (1)$$

in which:

$|\epsilon^2|$ is a matrix comprising the variance of the positioning errors of at least one optical element;

$|\sigma^2|$ is a matrix comprising the variance of the corresponding measurement errors; and $(|A|^{-1})^t$ is the transpose of the matrix $|A|^{-1}$.

This relationship (1) is used to optimally specify the characteristics and the properties of the means A1 to Am and of the means C1 to Cn which were mentioned above.

Figure 2:
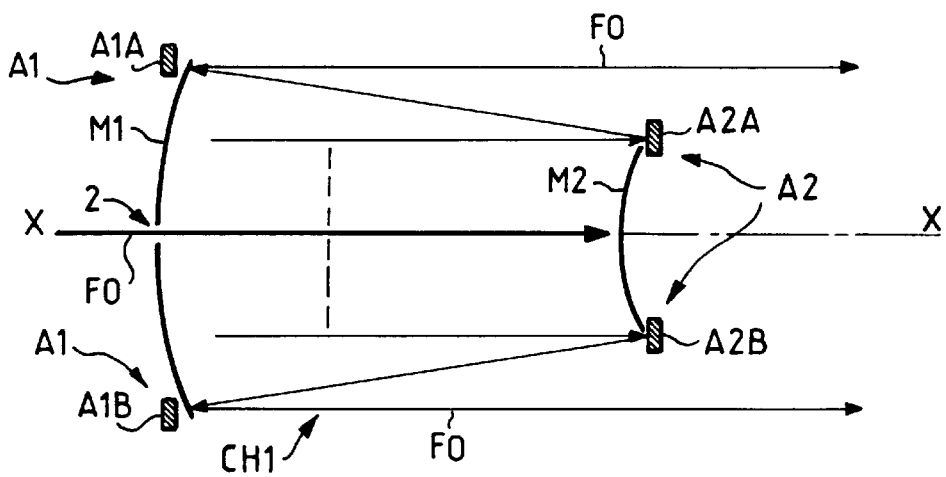
FIG. 2 illustrates a first application of a device according to the invention to a laser system.

FIG. 2 represents a first application of the invention to an optical system CH1 which corresponds to a laser cavity of known type and has two mirrors M1 and M2 as optical elements.

As is known, a laser amplifier medium, for example a gas, is trapped between the mirrors M1 and M2. The focal planes of said mirrors M1 and M2 coincide to form an afocal optical system.

To implement the invention, use is made of a laser beam F0 especially intended for this purpose, which is introduced into the laser cavity, for example through a small hole 2 made in the mirror M1 level with the optical axis X—X.

This laser beam F0 undergoes successive reflections on the mirrors M1 and M2 so that its diameter increases progressively until it can emerge from the cavity, as shown.

Measurement means A1 and A2, respectively, are provided on the mirrors M1 and M2. Each of said measurement means A1 and A2 has four photodiodes arranged symmetrically, with respect to the optical axis X—X, at the edges of said mirrors M1 and M2 as represented for the photodiodes A1A, A1B of the means A1 and the photodiodes A2A, A2B, A2C and A2D of the means A2 in FIGS. 2 and 3.

These means A1 and A2 operate according to the so-called "four quadrant" known principle.

By way of example, assuming that S1, S2, S3 and S4 represent the amplitudes of the signals picked up respectively by the photodiodes A2A, A2B, A2C, A2D, the image shifts My and Mz can now, respectively in the directions OY and OZ which are mutually orthogonal and are orthogonal to the axis X—X, be deduced therefrom on the basis of the relationships:

$$My = \frac{(S1+S2)-(S3+S4)}{S1+S2+S3+S4}$$

$$Mz = \frac{(S1+S4)-(S2+S3)}{S1+S2+S3+S4}$$

The values My and Mz thus determined are used for implementing the invention, that is to say for correcting the possible positioning errors of the mirrors M1 and M2, in the manner mentioned above.

Figure 4:
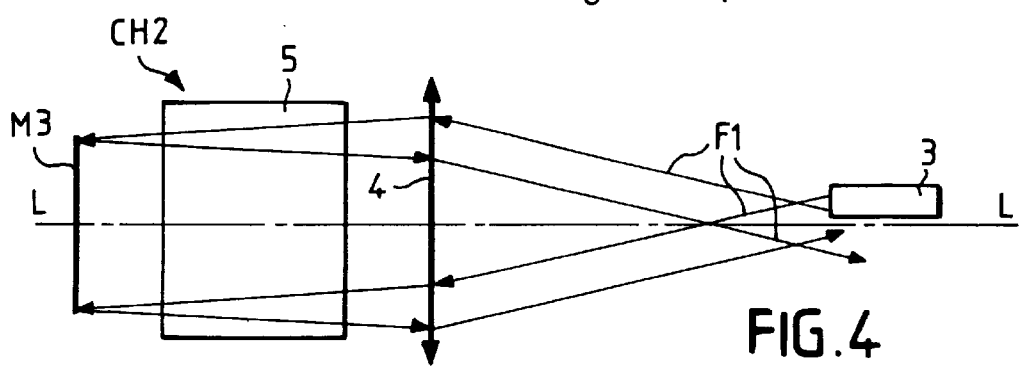
FIG. 4 shows a second application of a device according to the invention to an amplified laser system.

FIG. 4 represents a second application of the invention to an optical system CH2 which corresponds to an amplified laser system of known type and has a low-power drive laser 3 and, as optical elements, an objective lens 4 and a cavity mirror M3.

As is known, said laser system CH2 also has an amplifier medium 5 which, for example, includes flash-pumped neodyme glass rods and is intended to increase the power of the laser beam F1 generated by the drive laser 3.

As in the embodiment in FIG. 2, photodiodes (not shown) are arranged at the edges of the mirror M3 and of the objective lens 4. The positioning of these optical elements M3 and 4 is corrected in the same way as described above for the embodiment in FIG. 2.

What is claimed is:

1. A method for automatically correcting the positioning errors of optical elements (M1, M2, M3, 4) of an optical system (CH1, CH2) with respect to the optical axis (X—X, L—L) of said system (CH1, CH2), wherein m pairs of measurements are taken in different measurement planes of said system (CH1, CH2), m being an integer greater than or equal to 2, each of said m measurement pairs being representative of an image shift with respect to said optical axis (X—X, L—L) in the corresponding measurement plane;

a matrix relationship:

$$|M|=|A|.|C|$$

is defined, in which

.$|M|$ is a column vector comprising said m pairs of measurements;

.$|C|$ is a column vector comprising 2n values which are respectively representative of the positioning errors of n optical elements (M1, M2, M3, 4), n being an integer less than or equal to m; and .$|A|$ is a transformation matrix;

the transformation matrix $|A|$ is determined;

the 2n values of the column vector $|C|$ are calculated on the basis of the matrix expression:

$$|C|=|A|^{-1}.|M|,$$

$|A|^{-1}$ being the inverse matrix of $|A|$; and the positioning of said n optical elements (M1, M2, M3, 4) is modified respectively in accordance with the 2n values previously calculated, so as to correct the positioning errors.

2. The method as claimed in claim 1, wherein at least some of said measurement planes are the focal planes of optical elements.

3. The method as claimed in claim 1, wherein at least some of said measurement planes are the pupil planes of optical elements.

4. The method as claimed in claim 1, wherein the transformation matrix $|A|$ is determined through calculation, by simulating the path of a light beam (F0, F1) in said optical system (CH1, CH2) with the aid of geometrical optics.

5. The method as claimed in claim 1, wherein the transformation matrix $|A|$ is determined experimentally.

6. The method as claimed in claim 1, wherein, in order to measure the image shifts, images are formed with the aid of a light beam (F1) of the optical system (CH2).

7. The method as claimed in claim 1, wherein, in order to measure the image shifts, images are formed with the aid of an auxiliary light beam (F0).

8. The method as claimed in claim 1, wherein the matrix $|A|^{-1}$ is calculated, on the basis of the transformation matrix $|A|$, with the aid of an inversion method employing decomposition into singular values.

9. The method as claimed in claim 1, wherein a relationship between the measurement errors and the correction errors is determined on the basis of the expression:

$$|\epsilon^2|=|A|^{-1}.|\sigma^2|.(|A|^{-1})^t$$

in which:
- $|\epsilon^2|$ is a matrix comprising the variance of the positioning errors of at least one optical element (M1, M2, M3, 4);
- $|\sigma^2|$ is a matrix comprising the variance of the corresponding measurement errors; and
- $(|A|^{-1})^t$ is the transpose of the matrix $|A|^{-1}$.

10. A device for automatically correcting the positioning errors of optical elements (M1, M2, M3, 4) of an optical system (CH1, CH2) with respect to the optical axis (X—X, L—L) of said system (CH1, CH2), which device has:
- first means (A1, A2, Am) for taking 2m measurements in measurement planes of said system (CH1, CH2), m being an integer greater than or equal to 1, each of said 2m measurements being representative of an image shift with respect to said optical axis (X—X, L—L) in the corresponding measurement plane, and namely in a first direction (OY) of said measurement plane for one half of said measurements and in a second direction (OZ) for the other half;
- a calculation unit (UC) for determining, on the basis of said 2m measurements, 2n values which are respectively representative of positioning errors, both in said first and in said second directions (OY, OZ), of n optical elements (M1, M2, M3, 4), n being an integer less than or equal to m, said calculation unit (UC) using for this purpose the matrix expression $|M|=|A|.|C|$ with $|M|$ and $|c|$ being column vectors respectively comprising the 2m measurements and the 2n values and $|A|$ being a transformation matrix; and
- second means (C1, C2, Cn) for automatically modifying the positioning of said n optical elements (M1, M2, M3, 4), respectively in accordance with the 2n values calculated by the calculation unit (UC), so as to correct the positioning errors.

11. The device as claimed in claim 10, wherein at least some of said first means (A1, A2, Am) comprise image detectors and all associated automatic image-processing means.

12. The device as claimed in claim 10, wherein at least some of said second means (C1, C2, Cn) comprise electro-mechanical positioning components.

* * * * *